(12) United States Patent
Sugita

(10) Patent No.: US 11,263,635 B2
(45) Date of Patent: Mar. 1, 2022

(54) CHECK-OUT SYSTEM AND REGISTRATION APPARATUS

(71) Applicant: TOSHIBA TEC KABUSHIKI KAISHA, Tokyo (JP)

(72) Inventor: Nobuhiro Sugita, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 16/739,179

(22) Filed: Jan. 10, 2020

(65) Prior Publication Data

US 2020/0151722 A1 May 14, 2020

Related U.S. Application Data

(62) Division of application No. 15/371,613, filed on Dec. 7, 2016, now Pat. No. 10,572,878.

(30) Foreign Application Priority Data

Dec. 22, 2015 (JP) .................................. 2015-249966

(51) Int. Cl.
*G06Q 20/40* (2012.01)
*G06Q 30/06* (2012.01)
(Continued)

(52) U.S. Cl.
CPC ........... *G06Q 20/405* (2013.01); *G06Q 20/10* (2013.01); *G06Q 20/20* (2013.01); *G06Q 30/06* (2013.01)

(58) Field of Classification Search
CPC ........ G06Q 20/10; G06Q 20/20; G06Q 30/06; G06Q 20/405; G06Q 20/40
(Continued)

(56) References Cited

U.S. PATENT DOCUMENTS

| 5,902,983 A | 5/1999 | Crevelt et al. |
| 6,547,131 B1 | 4/2003 | Foodman et al. |

(Continued)

FOREIGN PATENT DOCUMENTS

| EP | 1927946 | 6/2008 |
| JP | 2013-242839 | 12/2013 |

OTHER PUBLICATIONS

Extended European Search Report for European Patent Application No. 16205397.9 dated Apr. 19, 2017.

(Continued)

*Primary Examiner* — Andrew Joseph Rudy
(74) *Attorney, Agent, or Firm* — Amin, Turocy & Watson, LLP

(57) ABSTRACT

A registration apparatus stores priority which is set for each of a plurality of payment apparatuses. If a condition to update the priority is established, the registration apparatus updates the priority, based on data indicating a state of each payment apparatus. The registration apparatus transmits accounting data and data on the priority, to a payment apparatus having a top priority. A payment apparatus pays a transaction by transmitting a permission response to the registration apparatus, when receiving the accounting data and the priority data in a state where the payment of the transaction is possible. The payment apparatus transfers the accounting data and the priority data to another payment apparatus having a lower priority than the payment apparatus, based on the priority data, when the accounting data and the priority data are received in a state where the payment of the transaction is not possible.

8 Claims, 9 Drawing Sheets

(51) Int. Cl.
  *G06Q 20/10* (2012.01)
  *G06Q 20/20* (2012.01)
(58) Field of Classification Search
  USPC .................................................. 705/16, 28
  See application file for complete search history.

(56) References Cited

U.S. PATENT DOCUMENTS

| | | | |
|---|---|---|---|
| 7,873,573 B2 | 1/2011 | Realini | |
| 8,023,425 B2 | 9/2011 | Raleigh | |
| 8,243,742 B2* | 8/2012 | Forsberg | H04L 41/5003 |
| | | | 370/401 |
| 8,249,965 B2 | 8/2012 | Tumminaro | |
| 8,365,993 B2 | 2/2013 | Teraoka et al. | |
| 8,392,261 B2 | 3/2013 | Lee et al. | |
| 8,893,009 B2 | 11/2014 | Raleigh et al. | |
| 8,960,540 B2* | 2/2015 | Smets | G06Q 20/3255 |
| | | | 235/380 |
| 9,537,939 B1 | 1/2017 | Harrell et al. | |
| 9,681,489 B2 | 6/2017 | He et al. | |
| 9,728,162 B2 | 8/2017 | Sasaki et al. | |
| 10,194,378 B2 | 1/2019 | Bird et al. | |
| 10,275,745 B2* | 4/2019 | Hankins | G06Q 40/00 |
| 10,326,800 B2 | 6/2019 | Raleigh et al. | |
| 10,374,908 B2* | 8/2019 | Mihaly | H04L 41/5019 |
| 10,572,878 B2* | 2/2020 | Sugita | G06Q 20/10 |
| 11,010,747 B2* | 5/2021 | Jones | G06Q 20/326 |
| 11,057,229 B2* | 7/2021 | Pirzadeh | G06Q 20/20 |
| 2008/0128497 A1 | 5/2008 | Teraoka et al. | |
| 2009/0098854 A1* | 4/2009 | Park | G06Q 20/3223 |
| | | | 455/407 |
| 2011/0184798 A1 | 7/2011 | Wang et al. | |
| 2011/0301982 A1 | 12/2011 | Green, Jr. et al. | |
| 2015/0213425 A1 | 7/2015 | Namura et al. | |
| 2016/0042330 A1* | 2/2016 | Cozens | G06Q 20/4016 |
| | | | 705/40 |
| 2017/0091767 A1 | 3/2017 | Yabu | |
| 2017/0178132 A1* | 6/2017 | Sugita | G06Q 30/06 |

OTHER PUBLICATIONS

European Office Action for European Patent Application No. 16205397.9 dated Dec. 4, 2018.

Non-Final Office Action for U.S. Appl. No. 15/371,613 dated May 28, 2019.

* cited by examiner

FIG. 1
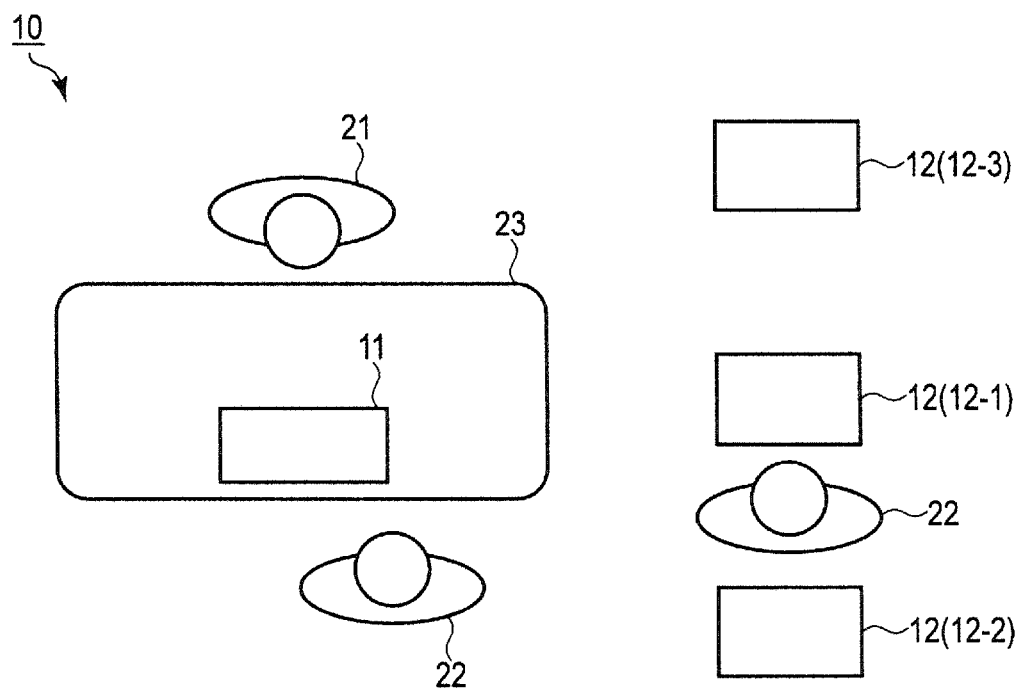
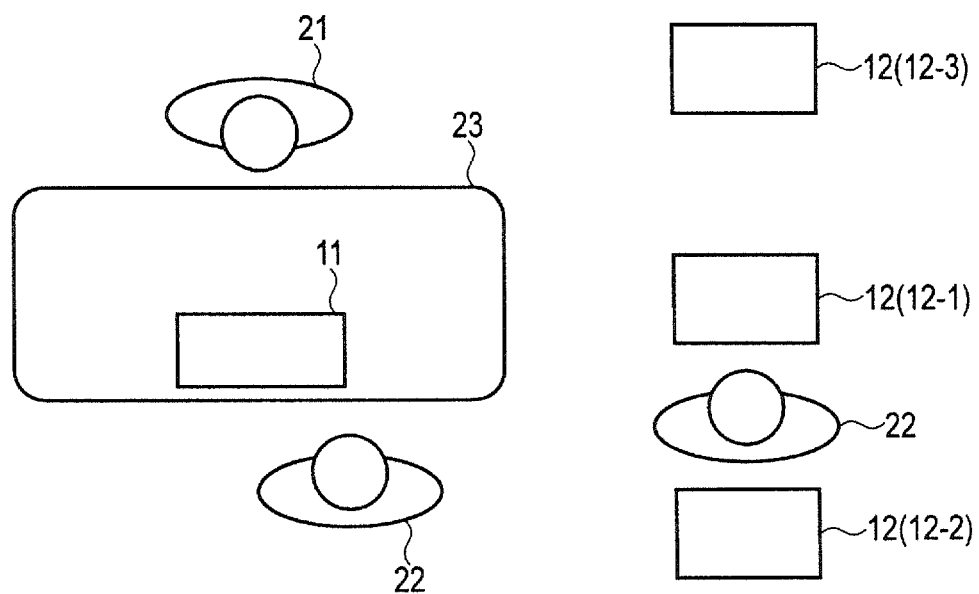

FIG. 3

| | MERCHANDISE CODE | MERCHANDISE NAME | UNIT PRICE | NUMBER | AMOUNT OF MONEY |
|---|---|---|---|---|---|
| 31 | 123456789 | MERCHANDISE A | 100 | 1 | 100 |

| | MERCHANDISE CODE | MERCHANDISE NAME | UNIT PRICE | NUMBER | AMOUNT OF MONEY |
|---|---|---|---|---|---|
| 32 | 123423456 | MERCHANDISE B | 200 | 1 | 200 |
| | | | | | |
| | | | | | |
| | ⋮ | ⋮ | ⋮ | ⋮ | |

| | TOTAL NUMBER | TOTAL AMOUNT OF MONEY |
|---|---|---|
| 33 | 2 | 300 |

FIG. 4

| | No. | PAYMENT APPARATUS ID | IDENTIFICATION NAME | STATUS |
|---|---|---|---|---|
| 41 | 1 | 12-1 | PAYMENT APPARATUS 1 | ST1 |
| | 2 | 12-2 | PAYMENT APPARATUS 2 | ST2 |
| | 3 | 12-3 | PAYMENT APPARATUS 3 | ST3 |

FIG. 9

| | MERCHANDISE NAME | NUMBER | UNIT PRICE | AMOUNT OF MONEY |
|---|---|---|---|---|
| | | | | |
| 1 | MERCHANDISE A | 1 | 100 | 100 |
| 2 | MERCHANDISE B | 1 | 200 | 200 |
| 3 | MERCHANDISE C | 1 | 300 | 300 |

Registration: 1

MERCHANDISE D — 400 YEN

ONE PIECE | 400 YEN | TOTAL | 4 PIECES 1000 YEN

FIG. 10

1 — PAYMENT

TOTAL | 4 PIECES | 1000 YEN

PLEASE OPERATE WHEN DISCOUNT IS GIVEN TO SUBTOTAL

- SUBTOTAL PRICE CUT (YEN) — B1
- SUBTOTAL DISCOUNT (%) — B2

ACCOUNTING — B4

CURRENT PRIORITY
[1] PAYMENT APPARATUS 1 (HAVING WARNING)
[2] PAYMENT APPARATUS 2 (IN ACCOUNTING)
[3] PAYMENT APPARATUS 3

PRIORITY CHANGE — B5

RETURN — B3

CHECK-OUT SYSTEM AND REGISTRATION APPARATUS

CROSS-REFERENCE TO RELATED APPLICATIONS

This application is a Divisional of application Ser. No. 15/371,613 filed on Dec. 7, 2016, the entire contents of which are incorporated herein by reference.

This application is based upon and claims the benefit of priority from Japanese Patent Application No. 2015-249966, filed Dec. 22, 2015, the entire contents of which are incorporated herein by reference.

FIELD

Embodiments described herein relate generally to a check-out system and a registration apparatus included in the system and methods related thereto.

BACKGROUND

As a check-out system for a mass retailer, there is a type in which a registration apparatus that generates accounting data required for payment of a transaction for each transaction, and a payment apparatus that processes the payment of the transaction based on the accounting data are separated. The registration apparatus waits for the input of data relating to merchandise sales. If the data relating to merchandise sales is input by an operator, the registration apparatus generates accounting data based on the data, and transmits the accounting data to the payment apparatus. The payment apparatus waits for the input of payment data for the accounting data. If the payment data is input by the operator, the payment apparatus processes the payment of a transaction based on the accounting data and the payment data. The check-out system of this type, in which the registration apparatus and the payment apparatus are separated, employs a dual system in which separate salespersons respectively operate the registration apparatus and the payment apparatus, or a sharing system, that is, a so-called semi-self-type in which a salesperson operates the registration apparatus and a shopper operates the payment apparatus.

In a case of the semi-self-type, if it takes time for the shopper to operate the payment apparatus, the subsequent shopper has to wait before executing their payment. In order to avoid such a delay, a plurality of payment apparatuses are connected to a single registration apparatus. The registration apparatus selects any payment apparatus at each transaction, and transmits accounting data to the payment apparatus. Therefore, the registration apparatus needs to select a payment apparatus which is a destination of accounting data for each transaction.

DESCRIPTION OF THE DRAWINGS

FIG. 1 is a schematic view of a check-out system according to an embodiment.

FIG. 3 is a schematic view illustrating main memory areas formed in a RAM of the registration apparatus.

FIG. 4 is a schematic view illustrating a list table stored in an auxiliary storage unit of the registration apparatus.

FIG. 9 is a schematic view illustrating a display example of a registration screen.

FIG. 10 is a schematic view illustrating a display example of an accounting check screen.

DETAILED DESCRIPTION

Figure 2:
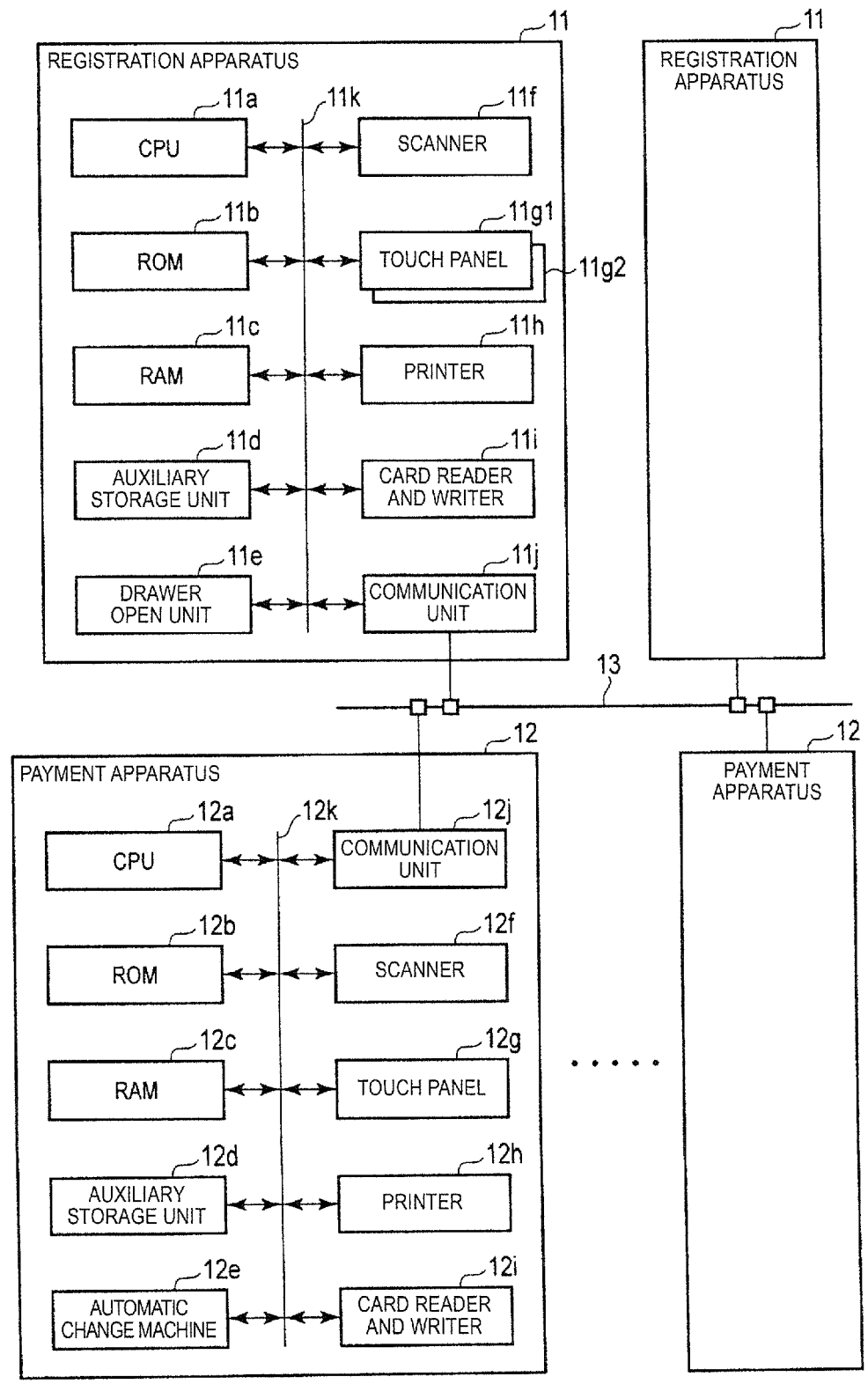
FIG. 2 is a block diagram illustrating main circuit configurations of a registration apparatus and a payment apparatus.
Figure 5:
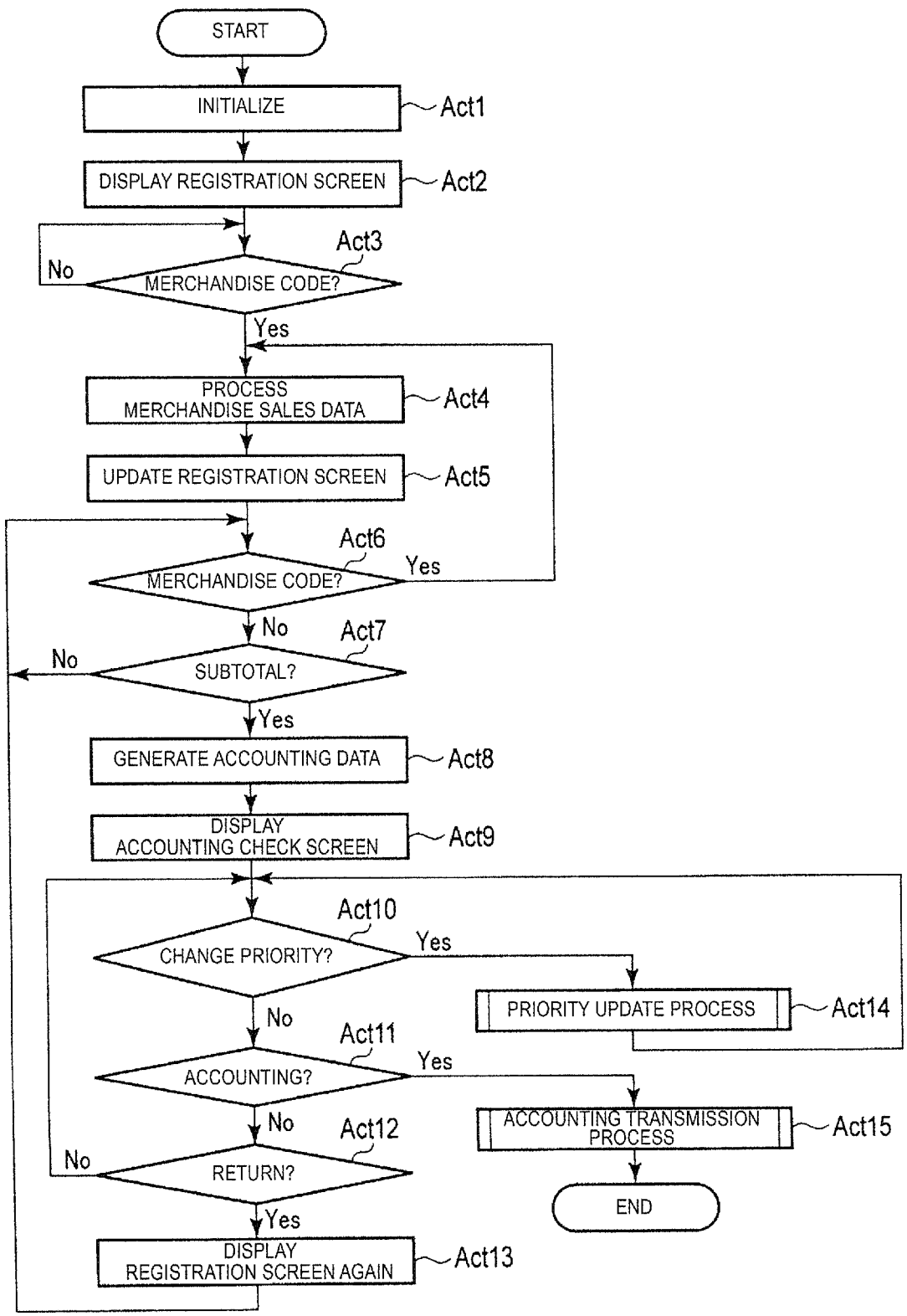
FIG. 5 is a flow chart illustrating a main procedure of information processing that a CPU of the registration apparatus executes.

Exemplary embodiments are intended to provide a check-out system in which a registration apparatus does not need to select a payment apparatus which is a destination of accounting data at each transaction, and a registration apparatus which is used in the system.

In general, according to one embodiment, a check-out system includes a registration apparatus that generates accounting data required for payment of a transaction for each transaction and a plurality of payment apparatuses which process payment of the transaction based on the accounting data, which are connected through a network. The registration apparatus includes storage means, update means, transmission means, and notification means. The storage means stores a priority which is set for each of the plurality of payment apparatuses. The update means updates the priority which is stored in the storage means, based on data indicating a state of each of the plurality of payment apparatuses, if a condition to update the priority is established. The transmission means transmits accounting data and data on the priority stored in the storage means, to a payment apparatus having a top priority, through the network. The notification means notifies of information for identifying any payment apparatus which is a transmission source of a permission response, in response to reception of the permission response from the payment apparatus through the network. The payment apparatus includes reception means, determination means, permission response means, and transfer means. The reception means receives the accounting data and the priority data through the network. The determination means determines whether or not the payment apparatus is in a state where payment of the transaction is possible. The permission response means transmits the permission response to the registration apparatus through the network, when the accounting data and the priority data are received in the state where the payment of the transaction is possible. The transfer means transfers the accounting data and the priority data to another payment apparatus having a lower priority than the payment apparatus, based on the priority data, through the network, when the accounting data and the priority data are received in a state where the payment of the transaction is not possible.

Hereinafter, a description will be given on an embodiment with reference to the drawings.

FIG. 1 is a schematic view of a check-out system 10 according to an embodiment. The check-out system 10 includes a plurality of registration apparatuses 11, and payment apparatuses 12 of a number larger than the number of the registration apparatuses 11. The registration apparatuses 11 and the payment apparatuses 12 are disposed in each check-out lane in a store.

FIG. 1 illustrates a case where two registration apparatuses 11 and six payment apparatuses 12 are disposed in two check-out lanes. Specifically, a single registration apparatus 11 and three payment apparatuses 12 (12-1, 12-2, and 12-3) are disposed in one check-out lane. The payment apparatus 12-1 is the closest to the registration apparatus 11, the payment apparatus 12-2 is the second closest to the registration apparatus 11, and the payment apparatus 12-3 is the farthest from the registration apparatus 11.

The check-out system 10 is the semi-self-type. In other words, the operator of the registration apparatus 11 is a salesperson 21 who works as a so-called checker. The operator of the payment apparatus 12 is a shopper 22 who purchases merchandise which is sold at a store.

The registration apparatus 11 is attached to a work table 23 in FIG. 1. The work table 23 has a rectangular top plate. A plurality of work tables 23 are arranged in such a manner that the longitudinal directions of the top plates are substantially parallel to each other, and form passages (checkout lanes) for the shoppers 22.

The registration apparatus 11 has respective functions of sales registration of merchandise, generation of accounting data, and transfer of the accounting data to the payment apparatus 12. The sales registration of merchandise is to register the data of merchandise that the shopper 22 purchases in the registration apparatus 11. For example, if a bar code that is attached to merchandise is scanned by a scanner, the data of the merchandise is registered in the registration apparatus 11. The accounting data is data related to accounting of merchandise of which sales is registered as a single transaction. A merchandise code, a merchandise name, a unit price, the number, the amount of money and the like are included in the accounting data.

The payment apparatus 12 has a function of payment. In other words, if accounting data is transferred from the registration apparatus 11, the payment apparatus 12 processes the payment of a transaction based on the accounting data. The payment process is to process payment for a transaction which is an action of buying and selling merchandise, based on the accounting data. Cash, credit cards, electronic moneys or the like are used for payment.

FIG. 2 is a block diagram illustrating main circuit configurations of the registration apparatus 11 and the payment apparatus 12. The registration apparatus 11 and the payment apparatus 12 are all connected to a local area network (LAN) 13 which is a network. Without being illustrated, a server is connected to the LAN 13. The server includes a merchandise database in which merchandise information such as a merchandise name and a unit price is set in association with a merchandise code of each piece of merchandise.

The registration apparatus 11 and the payment apparatus 12 exchange information through the LAN 13. Other communication networks such as the Internet or a wireless LAN may be used for the network, instead of the LAN 13. The registration apparatus 11 and the payment apparatus 12 may be configured to exchange information to each other through the server.

The registration apparatus 11 includes a CPU 11a, a ROM 11b, a RAM 11c, an auxiliary storage unit 11d, a drawer open unit 11e, a scanner 11f, two touch panels 11g1 and 11g2, a printer 11h, a card reader and writer 11i, a communication unit 11j, and a transmission system 11k.

The CPU 11a is connected to the ROM 11b, the RAM 11c and the auxiliary storage unit 11d through the transmission system 11k so as to constitute a computer.

The CPU 11a corresponds to the central portion of the computer. The CPU 11a controls respective units so as to realize various functions of the registration apparatus 11, based on the operating system, the middleware, and the application programs, which are stored in the ROM 11b and the RAM 11c. The ROM 11b corresponds to the main memory portion of the computer. The ROM 11b stores the operating system. The ROM 11b may store the middleware and application programs in some cases. Further, the ROM 11b may also store data that is referred to when the CPU 11a executes various processes. The RAM 11c corresponds to the main memory portion of the computer. The RAM 11c stores data that is referred to when the CPU 11a executes various processes. Further, the RAM 11c is utilized as a so-called work area for storing data that is temporarily used when the CPU 11a executes various processes. The auxiliary storage unit 11d corresponds to the auxiliary memory portion of the computer. The auxiliary storage unit 11d stores data used when the CPU 11a executes various processes or data that is generated in the process performed by the CPU 11a. As the auxiliary storage unit 11d, for example, an EEPROM, a HDD, a SSD, or the like can be used. The application program that is stored in the ROM 11b or the auxiliary storage unit 11d includes a control program describing information processing, which is executed in the registration apparatus 11.

The drawer open unit 11e automatically opens a drawer that is intended to accommodate money. The scanner 11f reads the bar code attached to merchandise, and obtains the merchandise code of the merchandise. One touch panel 11g1 of the two touch panels 11g1 and 11g2 is for a salesperson, and the other touch panel 11g2 is for a customer. Each of the touch panels 11g1 and 11g2 includes a display device and a touch sensor. The touch panel 11g1 for a salesperson is provided on the work table 23 in such a manner that the display screen faces the working space side of the salesperson 21. The touch panel 11g2 for a customer is provided on the work table 23 in such a manner that the display screen faces the aisle side for the shopper 22. The printer 11h issues a receipt by printing various types of strings, images, or the like on a receipt sheet. The card reader and writer 11i has a function of reading data recorded on the card, and a function of writing data into the card. The card may include payment cards such as a credit card, a debit card, an electronic money card, and a prepaid card. The communication unit 11j communicates data with a plurality of payment apparatuses 12 which are connected to each other through the LAN 13. The communication unit 11j can also communicate data with other registration apparatuses 11 through the LAN 13.

The transmission system 11k transmits data pieces which are exchanged between the CPU 11a, the ROM 11b, the RAM 11c, the auxiliary storage unit 11d, the drawer open unit 11e, the scanner 11f, the touch panels 11g1 and 11g2, the printer 11h, the card reader and writer 11i, and the communication unit 11j. As the transmission system 11k, a well-known transmission system including various buses such as a system bus and various interface circuits connecting the buses and respective units can be used. As hardware of such registration apparatus 11, for example, an existing POS terminal can be used.

The payment apparatus 12 includes a CPU 12a, a ROM 12b, a RAM 12c, an auxiliary storage unit 12d, an automatic change machine 12e, a scanner 12f, a touch panel 12g, a printer 12h, a card reader and writer 12i, a communication unit 12j, and a transmission system 12k. The automatic change machine 12e collects coins and bills that are input. Further, the automatic change machine 12e discharges the coins and bills as changes. The other functions of the CPU 12a, the ROM 12b, the RAM 12c, the auxiliary storage unit 12d, the scanner 12f, the touch panel 12g, the printer 12h, the card reader and writer 12i, the communication unit 12j, and the transmission system 12k are the same as those of the CPU 11a, the ROM 11b, the RAM 11c, the auxiliary storage unit 11d, the touch panels 11g1 and 11g2, the printer 11h, the card reader and writer 11i, the communication unit 11j, and the transmission system 11k of the registration apparatus 11. In other words, the CPU 12a is connected to the ROM 12b, the RAM 12c and the auxiliary storage unit 12d through the transmission system 12k so as to constitute a computer. The CPU 12a controls respective units so as to implement various operations of the payment apparatus 12, based on the operating system, the middleware, and the application programs, which are stored in the ROM 12b and the RAM 12c. The application program stored in the ROM 12b or the auxiliary storage unit 12d includes a control program describing information processing that is executed in the payment apparatus 12. As hardware of such payment apparatus 12, for example, a POS terminal which correlates with an existing self-type can be used.

In the check-out system 10 of such a configuration, data memory areas 31, 32 and 33, illustrated in FIG. 3, are respectively formed in the RAM 11c of the registration apparatus 11. The data memory area 31 is an area for temporarily storing a merchandise code, a merchandise name, a unit price, the number, and the amount of money of a piece of merchandise of which sales is registered. The merchandise code is a unique code for identifying each piece of merchandise individually. For example, a merchandise code which is represented by the bar code is attached to each piece of merchandise, and the registration apparatus 11 acquires the merchandise code by scanning the bar code by using the scanner 11f. The merchandise name and the unit price are respectively the name and the price per a piece of the merchandise that is identified by the corresponding merchandise code. The number is the sales number of the same merchandise, and the amount of money is the money of the merchandise of the sales number (sales money). Hereinafter, the data memory area 31 is referred to as a temporary buffer 31. The data memory area 32 is an area for storing data of all pieces of merchandise of which sales is registered as one transaction. The data includes respective items of a merchandise code, a merchandise name, a unit price, the number, and the amount of money. Hereinafter, the data memory area 32 is referred to as a transaction memory 32. The data memory area 33 is an area for storing the total number and the total amount of money of all pieces of merchandise of which sales is registered as one transaction. Hereinafter, the data memory area 33 is referred to as a total memory 33.

Further, the check-out system 10 stores a list table 41 illustrated in FIG. 4, in the auxiliary storage unit 11d of the registration apparatus 11. The list table 41 is an area for storing payment apparatus IDs, identification names, and statuses, in association with a series of list numbers starting from "1". The payment apparatus ID is assigned to each payment apparatus 12 in order to identify each payment apparatus 12, and is, for example, a unique ID that is stored in the ROM 12b. Incidentally, a registration apparatus ID for each registration apparatus 11 is also stored in the ROM 11b in the same manner. The identification name is a unique name that is set individually for each payment apparatus 12. The operator of the registration apparatus 11 is able to determine which payment apparatus 12 is indicated, based on the identification name. The status represents a state ("on standby", "in use", "in warning", or "in error") of the payment apparatus 12. "On standby" is a state where the payment apparatus waits for the accounting data to be transferred from the registration apparatus 11. "In use" is a state where the payment apparatus executes a payment process based on accounting data. "In warning" is a state where a warning is generated. Examples of warning include a warning indicating excess of cash or a warning indicating lack of cash, which is generated in the automatic change machine 12e, or a warning indicating that the receipt paper is almost run out of, which is generated in the printer 12h. "In error" is a state where an error occurs. Examples of error include an error due to cash full or no cash in the automatic change machine 12e, or an error due to no receipt paper or the occurrence of receipt paper jam in the printer 12h. In the present embodiment, status data ST representing "on standby" is set to "0", status data ST representing "in use" is set to "1", status data ST representing "in warning" is set to "2", and status data ST representing "in error" is set to "3".

When receiving a signal representing "in use" from any payment apparatus 12, the registration apparatus 11 changes the status corresponding to the payment apparatus ID of the payment apparatus 12 into "1". When receiving a signal representing "in warning" from any payment apparatus 12, the registration apparatus 11 changes the status corresponding to the payment apparatus ID of the payment apparatus 12 into "2". In the same way, when receiving a signal representing "in error" from any payment apparatus 12, the registration apparatus 11 changes the status corresponding to the payment apparatus ID of the payment apparatus 12 into "3". When receiving a signal representing that it is not in a state of "in use", "in warning" or "in error", from any payment apparatus 12, the registration apparatus 11 returns the status corresponding to the payment apparatus ID of the payment apparatus 12 into "0".

The registration apparatus 11 transmits the accounting data which is generated for each transaction, and the data on the list table 41, to the payment apparatus 12 (in the example of FIG. 4, the payment apparatus 12-1) which is identified by the payment apparatus ID associated with the list number "1" (transmission unit). The payment apparatus 12 includes a reception unit of the accounting data and the data on the list table 41. The payment apparatus 12 which receives the accounting data and the data on the list table 41 by the reception unit determines whether or not the payment apparatus is in a state where payment of the transaction is possible (determination unit). When the status is "in use" or "in error", the payment apparatus 12 is not able to pay the transaction. When the status is "on standby" or "in warning", the payment apparatus 12 is able to pay the transaction. When the payment apparatus 12 is not able to pay the transaction, the payment apparatus 12 transfers the accounting data and the list data, to the payment apparatus 12 (in the example of FIG. 4, the payment apparatus 12-2) which is identified by the payment apparatus ID associated with the list number "2" (transfer unit). When the payment apparatus 12 is able to pay the transaction, the CPU 12a of the payment apparatus 12 transmits a permission response to the registration apparatus 11 (permission response unit), and processes the payment of the transaction based on the accounting data. The registration apparatus 11 receiving the permission response notifies of and displays the information (for example, identification name) for identifying the payment apparatus 12 which is a transmission source of the permission response on one or both of the touch panel 11g1 and the touch panel 11g2 (notification unit). Here, the list table 41 constitutes a storage unit that stores the priority (list number) which is set for each of a plurality of payment apparatuses 12. The registration apparatus 11 includes a display unit that displays the priority of each of the plurality of payment apparatuses 12 which is stored in the list table 41 and the state of each of the payment apparatuses 12 on the touch panel 11g1. The registration apparatus 11 includes an instruction unit that gives an instruction to update the priority. The registration apparatus 11 regards the instruction of the update of the priority which is given by the instruction unit as the establishment of the condition to update the priority which is set for each of the plurality of payment apparatuses 12, and updates the priority by processing the data of the list table (update unit).

Hereinafter, the respective units described above will be described in detail with reference to FIG. 5 to FIG. 11. Incidentally, the contents of the process to be described below are merely an example, and it is possible to appropriately utilize various processes through which the same results can be achieved.

The registration apparatus 11 includes a registration mode as one of the operation modes. If the registration apparatus 11 is started in the registration mode, the CPU 11a starts the information processing procedure illustrated in the flowchart of FIG. 5. First, the CPU 11a initializes the memory as Act1. The temporary buffer 31, the transaction memory 32, and the total memory 33 are cleared by this initialization. Next, the CPU 11a displays a registration screen SC1 for sales person (see FIG. 9), on a part of the screen of the touch panel 11g1 as Act2. The CPU 11a displays a registration screen for a customer on a part of the screen of the touch panel 11g2.

The registration screen SC1 for a salesperson displays the contents of the temporary buffer 31, the transaction memory 32, and the total memory 33 to cause the salesperson 21 to recognize the implementation status of the registration process. An example of the registration screen SC1 is illustrated in FIG. 9. The registration screen SC1 includes display areas R1 and R2. The display area R1 has a display field r11, a display field r12, a display field r13, and a display field r14. The merchandise name and unit price, the number, and the amount of money of the merchandise of which sales is registered most recently are respectively displayed on the display fields r11, r12, and r13, based on the data in the temporary buffer 31. The total number and the total amount of money of each piece of merchandise of which sales is registered as one transaction are displayed in the display field r14, based on the data in the total memory 33. The display area R2 displays a registration merchandise list indicating the merchandise name, the number, the unit price, and the amount of money of the merchandise of which sales is registered earlier than the merchandise which is displayed in the display area R1. The registration merchandise list is generated based on the data in the transaction memory 32.

In addition, without being illustrated, the CPU 11a displays various function buttons such as a merchandise button intended for the salesperson 21 to designate the merchandise, and a subtotal button intended for the salesperson 21 to instruct the output of subtotal, in an area other than the area of the registration screen SC1, on the screen of the touch panel 11g1.

If the salesperson 21 checks that the registration screen SC1 is displayed on the touch panel 11g1, the salesperson 21 recognizes that it is possible to register the sales of the purchase merchandise that the shopper purchases. If the shopper 22 moves to the work table 23 with the purchase merchandise, the salesperson 21 sequentially inputs the merchandise codes of the purchase merchandise pieces, by operating, for example, the scanner 11f or the merchandise button. Then, when the input of the merchandise codes of all pieces of purchase merchandise is completed, the salesperson 21 touches the subtotal button. Through the above operations, the sales registration of the merchandise which is purchased by a single shopper is completed.

The CPU 11a of the registration apparatus 11 performs the following information processes, with respect to such a sales registration operation. First, the CPU 11a waits for the input of the merchandise code as Act3. If the merchandise code is input through the scanner 11f or the merchandise button (YES at Act3), the CPU 11a processes merchandise sales data as Act4. In other words, the CPU 11a acquires merchandise information such as the merchandise name and the unit price which are set in the merchandise database in association with the merchandise code. The CPU 11a calculates the amount of money for the number of merchandise, by multiplying the number by the unit price. If the number of merchandise is input by using ten keys or the like before the merchandise code is input, the number of merchandise is the input number; and if the number of merchandise is not input, the number of merchandise is "1". The CPU 11a generates merchandise sales data including a merchandise code, a merchandise name, a unit price, the number, and the amount of money in this way. The CPU 11a stores the merchandise sales data in the temporary buffer 31. In this case, if the temporary buffer 31 already stores the sales data of the purchase merchandise of which sales is registered immediately before, the CPU 11a stores new merchandise sales data in the temporary buffer 31, while moving the stored merchandise sales data to the transaction memory 32.

The CPU 11a updates the registration screen SC1 at Act5. In other words, the CPU 11a adds the number and amount of money stored in the temporary buffer 31 in the total memory 33. The CPU 11a displays the contents of the temporary buffer 31 and the total memory 33 in the display area R1, and displays the contents of the transaction memory 32 in the display area R2.

After updating the registration screen SC1, the CPU 11a checks whether or not the next merchandise code is input as Act6. If the merchandise code is not input (NO at Act6), the CPU 11a checks whether or not the subtotal button is touched as Act7. If the subtotal button is not touched (NO at Act7), the CPU 11a returns to the process of Act6. Thus, the CPU 11a waits for the input of the merchandise code or the touch of the subtotal button, as Act6 and Act7. In addition, if the occurrence of other events such as execution of other operations is checked in these standby states, the CPU 11a proceeds to a process corresponding to the occurred event. This operation is the same even in other standby states.

In the standby state of Act6 and Act7, if a merchandise code is input (YES at Act6), the CPU 11a returns to the process of Act4. The CPU 11a repeats the subsequent processes in the same manner as described above.

In the standby state of Act6 and Act7, if a subtotal button is touched (YES at Act7), the CPU 11a executes the process of Act8 and Act9. The processing procedures of Act8 and Act9 are not limited to this order. The order may be changed.

At Act8, the CPU 11a moves the merchandise sales data which is stored in the temporary buffer 31, to the transaction memory 32. The CPU 11a generates the accounting data by using the data in the transaction memory 32 and the data in the total memory 33 (generation unit). At Act9, the CPU 11a displays an accounting check screen SC2 on a part of the screen of the touch panel 11g1 (see FIG. 10).

An example of the accounting check screen SC2 is illustrated in FIG. 10. The accounting check screen SC2 includes display areas R3 and R4, and buttons B1, B2, B3, B4, and B5. The total number, the total amount of money, and the like of the total memory 33 are displayed in the display area R3. The buttons B1 and B2 are respectively a subtotal price cut button B1 and a subtotal discount button B2, intended for the salesperson 21 to apply price cut or a discount to the total amount of money. The button B3 is a return button B3 intended for the salesperson 21 to return a part area of the screen of the touch panel 11g1 to the registration screen SC1. The button B4 is an accounting button B4 intended for the salesperson 21 to instruct the transition to the accounting when the registration of merchandise for one transaction is ended. The current priorities of the respective payment apparatuses 12 (12-1, 12-2, and 12-3) which are disposed in the same check-out lane and the states of the payment apparatuses 12 are displayed in the display area R4. The priority matches the list number of the list table 41. The state of the payment apparatus 12 is based on the status of the list table 41. The CPU 11a generates and displays information on the display area R4 based on the data of the list table 41. The button B5 is a priority change button B5 intended for the salesperson 21 to instruct the change of the priority. Here, the priority change button B5 constitutes an instruction unit. In addition, the CPU 11a constitutes a display unit in cooperation with the touch panel 11g1.

The CPU 11a which displays the accounting check screen SC2 checks whether or not the priority change button B5 is input as Act10. If the priority change button B5 is not input (NO at Act10), the CPU 11a checks whether or not the accounting button B4 is input as Act11. If the accounting button B4 is not input (NO at Act11), the CPU 11a checks whether or not the return button B3 is input as Act12. If the return button B3 is not input (NO at Act12), the CPU 11a returns to the process of Act10. Thus, the CPU 11a waits for the input of the priority change button B5, the input of the accounting button B4, and the input of the return button B3, as Act10 to Act12.

The salesperson 21 who checks the accounting check screen SC2 checks whether or not the registration of the purchase merchandise is completed. If the registration is not completed, the salesperson 21 touches the return button B3.

In the standby states of Act10 to Act12, if the return button B3 is input (YES at Act12), the CPU 11a re-displays the registration screen SC1 in a part area of the screen of the touch panel 11g1 as Act13. Thereafter, the CPU 11a returns to the process of Act6, and repeats the subsequent processes in the same manner as described above.

If the registration of the purchase merchandise is completed, the salesperson 21 determines whether or not the priority of the payment apparatus 12 is to be changed, based on the contents of the display area R4. For example, if an error or a warning occurs in the payment apparatus 12 having the top priority, it is not preferable that the accounting data is transmitted to the payment apparatus 12. Thus, the salesperson 21 determines that the priority is to be changed. If it is determined that the priority is to be changed, the salesperson 21 touches the priority change button B5.

Figure 6:
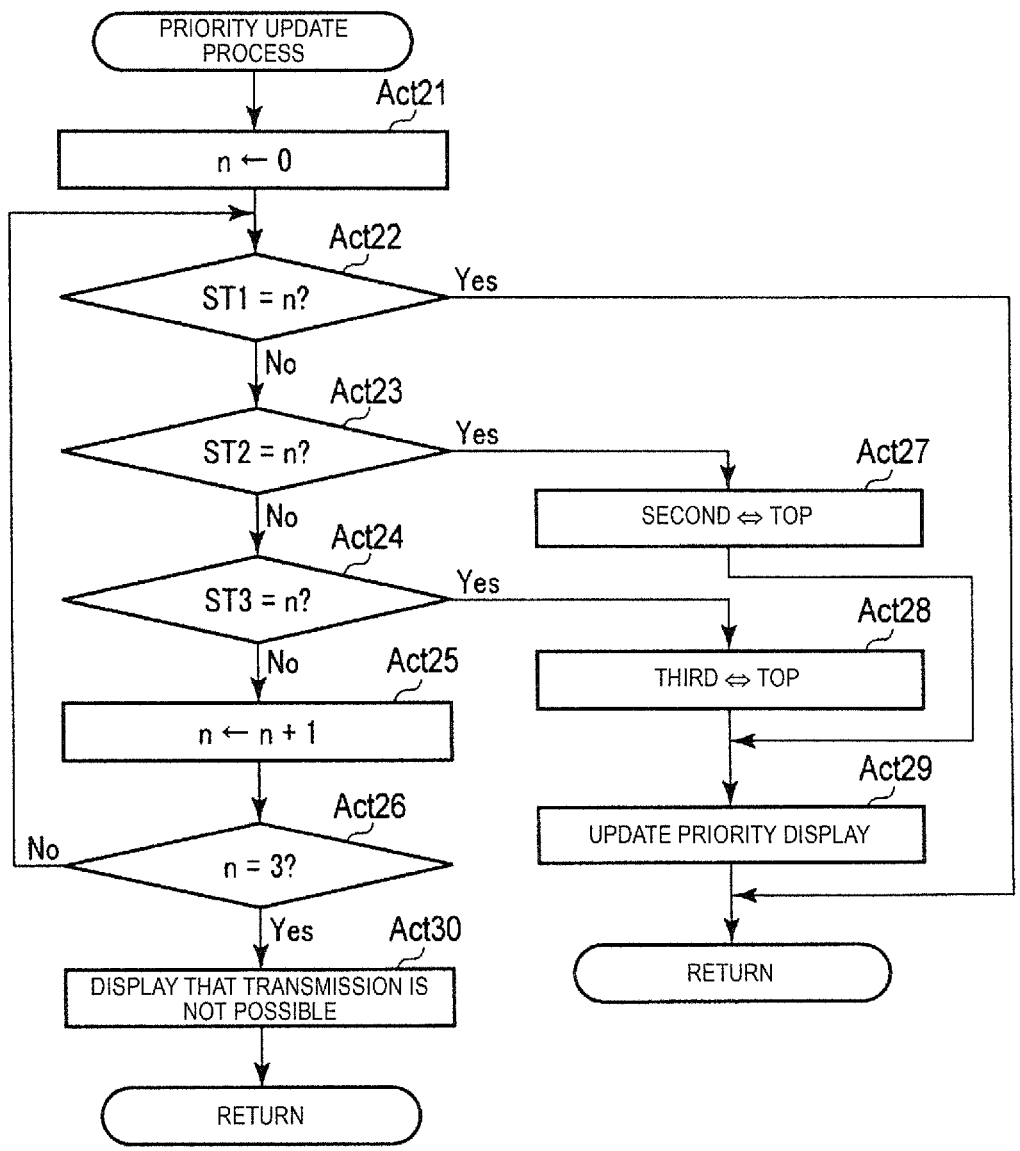
FIG. 6 is a flow chart specifically illustrating a procedure of a priority update process of FIG. 5.

In the standby states of Act10 to Act12, if the priority change button B5 is touched (YES at Act10), the CPU 11a starts the priority update process which is specifically illustrated in FIG. 6, as Act14. In the following, as illustrated in FIG. 10, the payment apparatus having the top priority at the current time is set to the payment apparatus 12-1, the payment apparatus having the second priority is set to the payment apparatus 12-2, and the payment apparatus having the third priority is set to the payment apparatus 12-3.

First, the CPU 11a resets the counter n to "0" as Act21. The counter n is formed in the RAM 11c. Next, the CPU 11a searches the list table 41 as Act22, and checks whether or not the status ST1 associated with the list number "1" matches the counter n. At the current time, the counter n is "0". Accordingly, if the status ST1 is "0 (on standby)", it is recognizes as match. If the status ST1 matches the counter n (YES at Act22), the CPU 11a returns to the standby state of Act10 to Act12. Accordingly, the priorities of the respect payment apparatuses 12-1, 12-2, and 12-3 are not changed.

If the status ST1 does not match the counter n (NO at Act22), the payment apparatus 12-1 is not "on standby". In this case, the CPU 11a, as Act23, checks whether or not the status ST2 associated with the list number "2" matches the counter n. In the case of match (YES at Act23), in other words, if the payment apparatus 12-2 is "on standby", the CPU 11a replaces the payment apparatus ID, the identification name, and the status, which are associated with the list number "2" with the payment apparatus ID, the identification name, and the status, which are associated with the list number "1", as Act27. The CPU 11a rewrites the contents of the display area R4, based on the data in the list table 41 as Act29. Thereafter, the CPU 11a returns to the standby state of Act10 to Act12. Thus, the payment apparatus 12-1 having the top priority is replaced with the payment apparatus 12-2 having the second priority.

If the status ST2 does not match the counter n (NO at Act23), the payment apparatus 12-2 is not "on standby". In this case, the CPU 11a checks whether or not the status ST3 associated with the list number "3" matches the counter n, as Act24. In the case of match (YES at Act24), in other words, if the payment apparatus 12-3 is "on standby", the CPU 11a replaces the payment apparatus ID, the identification name, and the status, which are associated with the list number "3" with the payment apparatus ID, the identification name, and the status, which are associated with the list number "1", as Act28. The CPU 11a rewrites the contents of the display area R4, based on the data in the list table 41 as Act29. Thereafter, the CPU 11a returns to the standby state of Act10 to Act12. Thus, the payment apparatus 12-1 having the top priority is replaced with the payment apparatus 12-3 having the third priority.

If the status ST3 does not match the counter n (NO at Act24), the payment apparatus 12-3 is not "on standby". In this case, the CPU 11a counts up the counter n by "1", as Act25. The CPU 11a checks whether or not the counter n reaches the maximum value "3" of the status, as Act26. If the counter n does not reach the maximum value "3" of the status (NO at Act26), the CPU 11a returns to the process of Act22. The CPU 11a repeats the subsequent processes in the same manner as described above.

By repeating this, if the payment apparatus 12-1 is under accounting (the status ST1 is "1"), the priority is not changed. If the payment apparatus 12-1 is "in warning" or "in error" (the status ST1 is "2" or "3") and the payment apparatus 12-2 is under accounting (the status ST2 is "1"), the priority of the payment apparatus 12-2 becomes top, and the priority of the payment apparatus 12-1 becomes the second. If the payment apparatus 12-1 and the payment apparatus 12-2 are "in warning" or "in error" and the payment apparatus 12-3 is under accounting (the status ST3 is "1"), the priority of the payment apparatus 12-3 becomes top, and the priority of the payment apparatus 12-1 becomes the third.

If any of the payment apparatuses 12-1, 12-2, and 12-3 is "in warning" or "in error", the counter n becomes "2". The CPU 11a repeats Act22 and the subsequent processes in the same manner as described above. By repeating this, if the payment apparatus 12-2 is "in warning" (the status ST1 is "2"), the priority is not changed. If the payment apparatus 12-2 is "in error" and the payment apparatus 12-2 is "in warning" (the status ST2 is "2"), the priority of the payment apparatus 12-2 becomes top, and the priority of the payment apparatus 12-1 becomes the second. If the payment apparatus 12-1 and the payment apparatus 12-2 are "in error" and the payment apparatus 12-3 is "in warning" (the status ST3 is "2"), the priority of the payment apparatus 12-3 becomes top, and the priority of the payment apparatus 12-1 becomes the third. Here, the CPU 11a constitutes the update unit by the processes of Act27 and Act28.

If any of the payment apparatuses 12-1, 12-2, and 12-3 is "in error", the counter n becomes "3". If the counter n becomes "3" (YES at Act26), the CPU 11a displays a message indicating that transmission of the accounting data is not possible, in a part area of the accounting check screen SC2, for example, the display area R4, as Act30. Thereafter, the CPU 11a returns to the standby state of Act10 to Act12.

Thus, when it is determined that the priority of the payment apparatus 12 is changed, or the change of the priority is not required, the salesperson 21 touches the accounting button B4.

Figure 7:
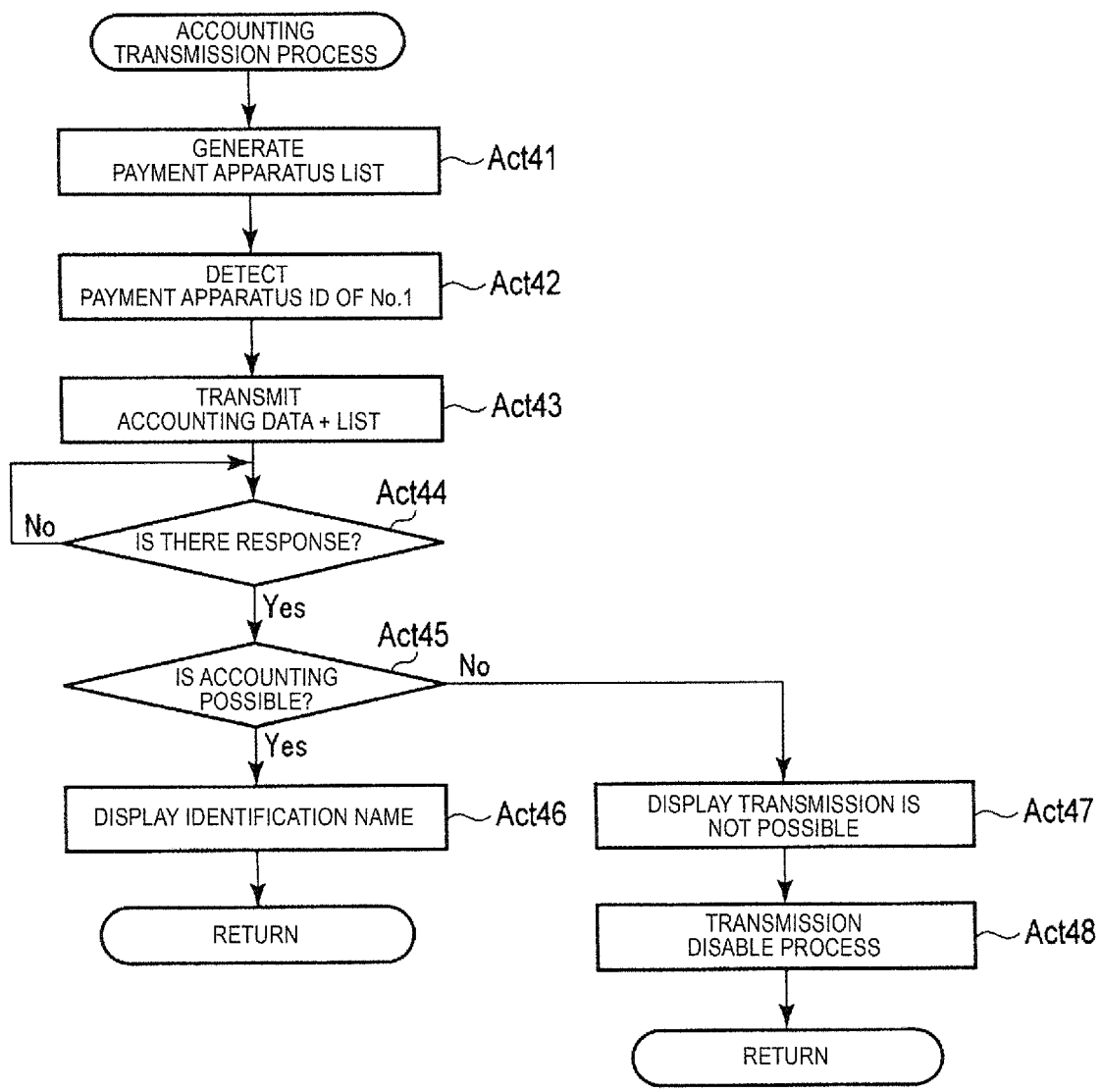
FIG. 7 is a flow chart specifically illustrating a procedure of an accounting transmission process of FIG. 5.
Figure 8:
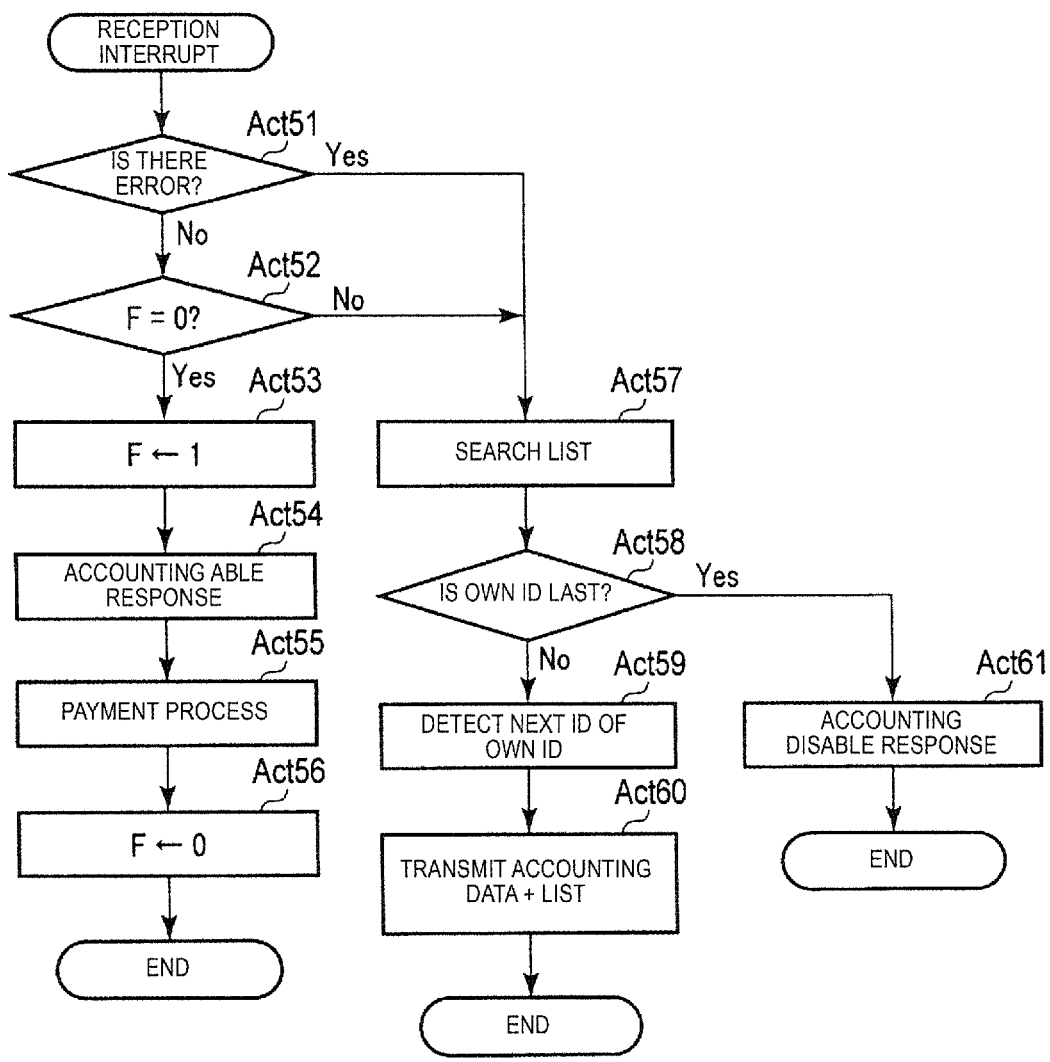
FIG. 8 is a flow chart illustrating a main procedure of a reception interrupt process that a CPU of the payment apparatus executes.

In the standby state of Act10 to Act12, if the accounting button B4 is touched (YES at Act11), the CPU 11a executes an accounting transmission process which is specifically illustrated in FIG. 7 as Act15. First, the CPU 11a reads the list number, the payment apparatus ID, and the identification name from the list table 41, and generates a list in which payment apparatuses ID and identification names are arranged, in an ascending order of the list number, as Act41. Next, the CPU 11a detects the payment apparatus ID of the list number "1" from the list table 41 as Act42. The CPU 11a instructs the communication unit 11j to transmit the accounting data generated in the process of Act8 and the list data generated in the process of Act41, with the payment apparatus ID of the list number "1" as a destination, as Act43.

In response to the instruction, the communication unit 11j transmits "accounting data+list data" of which a transmission source is the registration apparatus ID which is stored in the ROM 11b, with the payment apparatus ID of the list number "1" as a destination, over the LAN 13. The "accounting data+list data" is received by the payment apparatus 12 for which the destination payment apparatus ID matches the payment apparatus ID stored in the ROM 12b. Here, the CPU 11a cooperates with the communication unit 11j to constitute a transmission unit.

When receiving the "accounting data+list data" through the communication unit 12j, the CPU 12a of each payment apparatus 12 checks whether or not the payment apparatus ID which is attached to the data as the transmission destination matches the payment apparatus ID stored in the ROM 12b. If the two payment apparatus IDs do not match, the CPU 12a discards the "accounting data+list data". If the two payment apparatus IDs match, the CPU 12a achieves the "accounting data+list data". The CPU 12a starts a reception interrupt process which is specifically illustrated in FIG. 8. Here, the CPU 12a cooperates with the communication unit 12j to constitute a reception unit.

If the reception interrupt process is started, the CPU 12a first checks whether or not an error occurs in the automatic change machine 12e, the printer 12h, or the like, as Act51. When an error occurs, the payment apparatus 12 is not able to pay a new transaction. In this case (YES at Act51), the CPU 12a proceeds to a process of Act57 described later.

When an error does not occur (NO at Act51), the CPU 12a checks a busy flag F as ACT 52. The busy flag F is one-bit data which is set to "1" while the CPU 12a processes the payment of the transaction based on the accounting data, and is reset to "0" if the process is ended, and is stored in the RAM 12c. When the busy flag F is set, the payment apparatus 12 is on the process of payment of a transaction. Therefore, the payment apparatus 12 is not able to pay a new transaction. In this case (NO at Act52), the CPU 12a proceeds to a process of Act57 described later. Here, the CPU 12a constitutes a determination unit by the processes of Act51 and Act52.

When the busy flag F is reset, that is, when the payment apparatus 12 is in a state of being capable of executing the payment of the transaction (YES at Act52), the CPU 12a executes the processes of Act53, Act54, and Act55. The processing procedures of Act53, Act54, and Act55 are not limited to this order. The order may be changed.

At Act53, the CPU 12a sets the busy flag F to "1". At Act54, the CPU 12a instructs the communication unit 12j to transmit the command data of an accounting able response to the registration apparatus 11 which is a data transmission source. In response to the instruction, the communication unit 12j transmits the command data of an accounting able response of which a transmission source is the payment apparatus ID which is stored in the ROM 12b, with the registration apparatus ID which is set to the transmission source of "accounting data+list data" as a destination, over the LAN 13. The command data is received by the registration apparatus 11 of which the destination registration apparatus ID matches the registration apparatus ID stored in the ROM 11b. Here, the CPU 12a cooperates with the communication unit 12j to constitute a permission response unit.

At Act55, the CPU 12a executes a payment process based on the received accounting data. Since a payment process is a process to pay the transaction indicated by the accounting data in response to the operation by the shopper 22, and is the same as the process that is performed by an existing self-POS terminal, the detailed description thereof will be omitted. If the payment process is completed, the CPU 12a resets the busy flag F to "0" (Act56).

Meanwhile, when an error occurs in the automatic change machine 12e, the printer 12h, or the like (YES at Act51), or the busy flag F is set (NO at Act52), the CPU 12a searches the list data as Act57. The CPU 12a checks whether or not the payment apparatus ID stored in the ROM 12b is associated with the last list number of the list data as Act58. If the payment apparatus ID is not associated with the last list number (NO at Act58), the CPU 12a detects the payment apparatus ID which is associated with the list number obtained by adding "1" to the list number associated with the payment apparatus ID stored in the ROM 12b, from the list data, as Act59. The CPU 12a instructs the communication unit 12j to transfer "accounting data+list data", with the detected payment apparatus ID as a destination as Act60. In response to this command, the communication unit 12j transmits "accounting data+list data", with the detected payment apparatus ID as a destination, by using the registration apparatus ID indicating the transmission source as it is, over the LAN 13. The "accounting data+list data" is received by the payment apparatus 12 of which the destination payment apparatus ID matches the payment apparatus ID stored in the ROM 12b. Here, the CPU 12a cooperates with the communication unit 12j to constitute a transfer unit.

In contrast, if the payment apparatus ID is associated with the last list number (the maximum value of the list number)

(YES at Act58), the CPU 12a instructs the communication unit 12j to transmit command data of an accounting disable response to the registration apparatus 11 which is a data transmission source, as Act61. In response to this instruction, the communication unit 12j transmits the command data of an accounting disable response of which a transmission source is the payment apparatus ID stored in the ROM 12b, with the registration apparatus ID which is set to the transmission source of "accounting data+list data" as a destination, over the LAN 13. The command data is received by the registration apparatus 11 of which destination registration apparatus ID matches the registration apparatus ID stored in the ROM 11b.

Figure 11:
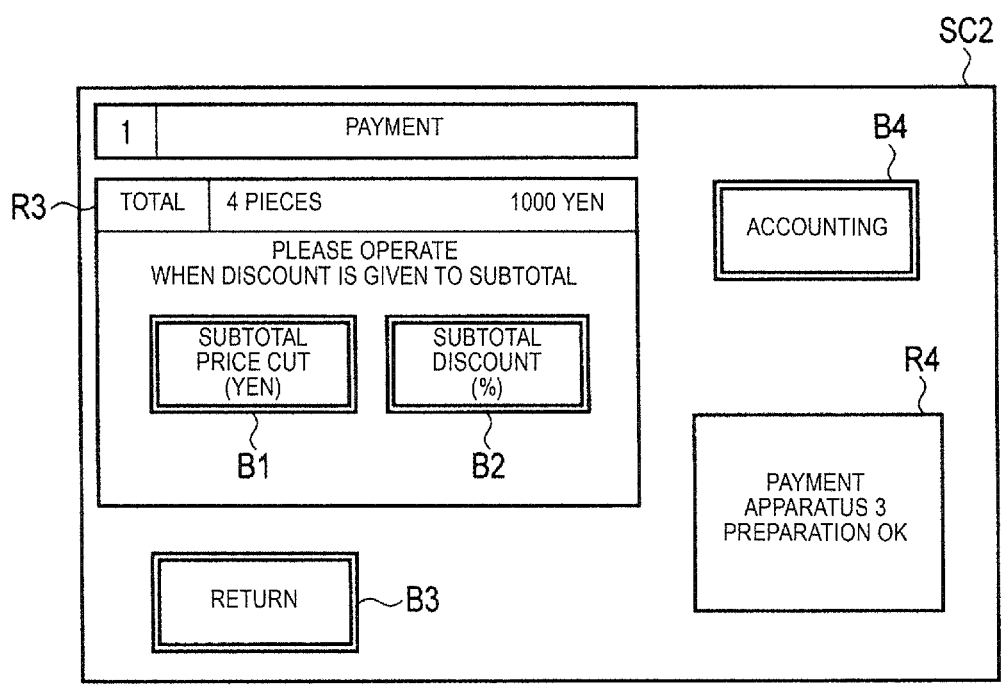
FIG. 11 is a schematic view illustrating another display example of the accounting check screen.

The CPU 11a of the registration apparatus 11 that transmits "accounting data+list data" as Act43 of FIG. 7 waits for a response from the payment apparatus 12, as Act44. If command data indicating the response is received through the communication unit 11j (YES at Act44), the CPU 11a identifies whether the command data is an accounting able response or an accounting disable response, as Act45. In the case of the accounting able response (YES at Act45), the CPU 11a displays the identification name of the payment apparatus 12 which is the transmission source of the accounting able response on an accounting check screen SC2, as Act 46. In other words, the CPU 11a searches the list table 41, and reads the identification name which is stored in association with the payment apparatus ID which is the command data transmission source. As illustrated in FIG. 11, the CPU 11a displays a message indicating that the payment apparatus 12 having this identification name is prepared for the accounting, in some area R4 of the accounting check screen SC2. The salesperson who checks this message notifies the shopper to perform accounting at the payment apparatus 12 which is specified by the identification name. Here, the CPU 11a in cooperation with the touch panel high constitutes a notification unit.

Meanwhile, in the case of the accounting disable response (NO at Act45), the CPU 11a displays a message indicating that the transmission of the accounting data is not possible, in some area of the accounting check screen SC2, for example, the display area R4, as Act47. Thereafter, the CPU 11a executes a transmission disable process as Act48. In the transmission disable process, for example, the accounting data with a unique identification code attached thereto is transmitted to a server, and an accounting ticket having a bar code printed thereon indicating the identification code is issued by driving the printer 11h. The accounting ticket is passed to the shopper. The shopper operates, for example, the scanner 12f of the payment apparatus 12 which is prepared in a location separate from the chuck-out lane to read the bar code of the accounting ticket. Thus, the CPU 12a of the payment apparatus 12 acquires the accounting data attached with the identification code acquired from the bar code, from the server. The CPU 12a executes the payment process, based on the accounting data.

According to the check-out system 10 which operates in this way, the registration apparatus 11 transmits the accounting data to the payment apparatus 12 that is set to have a top priority. The payment apparatus 12, which receives the accounting data from the registration apparatus 11 in a state where the payment of the transaction is executable, processes the payment of the transaction, based on the accounting data. However, when receiving the accounting data in a state where the payment of the transaction is not executable, the payment apparatus 12 cannot process the payment. In this case, the payment apparatus transfers the accounting data to another payment apparatus 12 in which a lower priority is set. If the payment apparatus 12 that receives the accounting data transferred from other payment apparatus 12 is capable of executing the payment of the transaction, the payment apparatus 12 processes the payment of the transaction, based on the transferred accounting data. Thus, for example, even if the payment apparatus 12 which receives the accounting data from the registration apparatus 11 is not capable of executing the payment, if another payment apparatus 12 is in a state of capable of executing the payment, the payment is processed. Therefore, since the registration apparatus 11 may transmit the accounting data to the payment apparatus 12 in which the top priority is set, it is not necessary to perform a process of selecting a payment apparatus which is a destination of the accounting data at each transaction. Therefore, for example, it is possible to reduce the work burden of salesperson 21, as compared to a case where the salesperson 21 selects a destination at each transaction. In addition, it is possible to reduce the processing load of the registration apparatus 11, as compared to a case where the registration apparatus 11 selects a destination at each transaction, based on the state of each payment apparatus 12.

In addition, the priority of each payment apparatus 12 and the status of each payment apparatus 12 are displayed on the accounting check screen SC2 of the registration apparatus. Thus, for example, if a warning indicating excess of cash in the automatic change machine 12e is generated in the payment apparatus 12 having the top priority, the salesperson touches the priority change button B5. Here, as illustrated in FIG. 10, if it is assumed that the payment apparatus having the second priority is under accounting, and the payment apparatus having the third priority is on standby, the payment apparatus having the third priority is ranked up to the top priority. Accordingly, thereafter, since the accounting data is transmitted to the payment apparatus 12 which is in warning only when any payment apparatus having the top or the second priority is not capable of executing the payment of the transaction, it is possible to delay the money from being full in the automatic change machine 12e. Thus, in the meantime, since it is possible to release the warning due to the recovery of cash from automatic change machine 12e, it is possible to prevent the occurrence of the error in advance.

The present disclosure is not limited to the exemplary embodiment described herein.

For example, in the embodiment, the priority update process is executed on the condition that the priority change button B5 is operated, but the condition on which the priority update process is executed is not limited to the button operation. For example, the priority update process may be executed on the condition that the CPU 11a of the registration apparatus 11 monitors the status of the list table 41, and detects that the status of the payment apparatus having the top priority is in a warning state or an error state, it may execute the priority update process.

While certain embodiments of the present invention have been described, these embodiments have been presented by way of example, and are not intended to limit the scope of the inventions. Indeed, the novel embodiments may be embodied in a variety of other forms; furthermore, various omissions, substitutions and changes may be made without departing from the spirit of the inventions. The embodiments and modifications are included in the scope and spirit of the invention, and are included in the invention described in the accompanying claims and their equivalents.

What is claimed is:

1. A registration apparatus together with a plurality of payment apparatuses constituting a check-out system, the payment apparatus transmitting a permission response through a network, when accounting data and data on a priority are received in a state where payment of a transaction is possible, and transferring the accounting data and the priority data to another payment apparatus having a lower priority than the payment apparatus within the plurality of payment apparatuses, based on the priority data, through the network, when the accounting data and the priority data are received in a state where the payment of the transaction is not possible, the registration apparatus comprising:
generation means for generating accounting data required for payment of a transaction for each transaction;
storage means for storing a priority which is set for each of the plurality of payment apparatuses;
update means for updating the priority which is stored in the storage means, based on data indicating a state of each of the plurality of payment apparatuses, if a condition to update the priority is established;
transmission means for transmitting the accounting data and data on the priority stored in the storage means, to a payment apparatus having a top priority, through the network; and
notification means for notifying of information for identifying any payment apparatus which is a transmission source of a permission response, in response to reception of the permission response from the payment apparatus through the network.

2. The registration apparatus according to claim 1, further comprising:
display means for displaying the priority of each of the plurality of payment apparatuses which is stored in the storage means and the state of each payment apparatus.

3. The registration apparatus according to claim 1, further comprising:
instruction means for giving an instruction to update the priority,
wherein the update means updates the priority, on a condition that the instruction to update the priority is given by the instruction means.

4. The registration apparatus according to claim 1,
wherein the update means updates the priority, on a condition that the payment apparatus, of which the priority stored in the storage means is top, is in a predetermined state.

5. A registration method, comprising:
generating accounting data required for payment of a transaction for each transaction;
storing a priority which is set for each of a plurality of payment apparatuses;
updating the stored priority based on data indicating a state of each of the plurality of payment apparatuses, if a condition to update the priority is established;
transmitting the accounting data and data on the stored priority to a payment apparatus having a top priority, through a network; and
notifying of information for identifying any payment apparatus which is a transmission source of a permission response, in response to reception of the permission response from the payment apparatus through the network.

6. The registration method according to claim 5, further comprising:
displaying the stored priority of each of the plurality of payment apparatuses and the state of each payment apparatus.

7. The registration method according to claim 5, further comprising:
giving an instruction to update the priority; and
updating the priority, on a condition that the instruction to update the priority is given.

8. The registration method according to claim 5, further comprising:
updating the stored priority, on a condition that the payment apparatus is top, in a predetermined state.

* * * * *